US 8,660,693 B2

(12) United States Patent
Suh et al.

(10) Patent No.: US 8,660,693 B2
(45) Date of Patent: Feb. 25, 2014

(54) COMPONENT INTEGRATION APPARATUS AND METHOD FOR COLLABORATION OF HETEROGENEOUS ROBOT

(75) Inventors: Young-Ho Suh, Gwangju (KR); Kang-Woo Lee, Daejeon (KR); Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 560 days.

(21) Appl. No.: 12/968,995

(22) Filed: Dec. 15, 2010

(65) Prior Publication Data
US 2011/0153077 A1 Jun. 23, 2011

(30) Foreign Application Priority Data

Dec. 18, 2009 (KR) .................. 10-2009-0126722
Apr. 1, 2010 (KR) .................. 10-2010-0029956

(51) Int. Cl.
*G06F 19/00* (2011.01)
*B25J 9/00* (2006.01)
*H04Q 7/00* (2006.01)

(52) U.S. Cl.
USPC ........... 700/246; 700/245; 700/247; 370/328; 370/466; 901/47; 901/50; 348/61

(58) Field of Classification Search
USPC .................. 700/245, 247, 259, 246; 348/61; 901/47, 50, 1; 370/328, 351, 466; 455/41.1; 709/229; 340/305
See application file for complete search history.

(56) References Cited

U.S. PATENT DOCUMENTS

| | | | | |
|---|---|---|---|---|
| 5,634,010 A | * | 5/1997 | Ciscon et al. | 709/223 |
| 7,388,879 B2 | * | 6/2008 | Sabe et al. | 370/466 |
| 7,720,572 B2 | * | 5/2010 | Ziegler et al. | 700/245 |
| 7,957,837 B2 | * | 6/2011 | Ziegler et al. | 700/258 |
| 8,195,333 B2 | * | 6/2012 | Ziegler et al. | 700/259 |
| 2003/0095514 A1 | * | 5/2003 | Sabe et al. | 370/328 |
| 2005/0080514 A1 | | 4/2005 | Omote et al. | |
| 2007/0070038 A1 | * | 3/2007 | Hoffberg et al. | 345/156 |

FOREIGN PATENT DOCUMENTS

| | | |
|---|---|---|
| JP | 2003-291083 | 10/2003 |
| JP | 2005-78456 | 3/2005 |
| JP | 2005-196427 | 7/2005 |
| JP | 2005-319526 | 11/2005 |
| JP | 2007-245317 | 9/2007 |
| JP | 2007-249801 | 9/2007 |
| KR | 10-2005-0108518 | 11/2005 |
| KR | 1020080019826 | 3/2008 |
| KR | 1020090041997 | 4/2009 |
| WO | 2005/109299 A1 | 11/2005 |

* cited by examiner

*Primary Examiner* — Ronnie Mancho

(74) *Attorney, Agent, or Firm* — Nelson Mullins Riley & Scarborough LLP; Anthony A. Laurentano, Esq.

(57) ABSTRACT

Provided is a technique that enables a robot to be remotely controlled (by a server) and enables a robot component to access an external component (a component of a server) in order for cooperation of heterogeneous robots operating on the basis of different component models. A component integration apparatus for collaboration of a heterogeneous robot according to an embodiment of the present invention comprises: a standard interface unit that provides a common standard interface for controlling components that control the individual functions of the robot; an adapter component that transmits commands to enable external components to call the components through the standard interface unit; and a proxy component that transmits commands to enable the components to call the external components through the standard interface unit.

14 Claims, 3 Drawing Sheets

COMPONENT INTEGRATION APPARATUS AND METHOD FOR COLLABORATION OF HETEROGENEOUS ROBOT

CROSS REFERENCE TO RELATED APPLICATION

This application claims the benefit of Korean Patent Application No. 10-2009-0126722, filed on Dec. 18, 2009 and Korean Patent Application No. 10-2010-0029956, filed on Apr. 1, 2010, which are hereby incorporated by reference in its entirety into this application.

BACKGROUND OF THE INVENTION

1. Field of the Invention

The present invention relates to a component integration apparatus and method for collaboration of a heterogeneous robot, and more particularly, to a component integration apparatus and method for collaboration of heterogeneous robot which enables a robot to be externally controlled and enables a component of a robot to access an external component in order for collaboration of heterogeneous robots operating on the basis of different component models.

2. Description of the Related Art

In general, it is a recent trend for robot platforms having various actuators and sensors to use component-based application programming models in order to controlling and integrating the individual actuators and sensors. In other words, component-based application programming models define individual component specifications with respect to controls of the individual unit devices of robots (for example, wheel control, head control, touch censor control, distance sensor control, position sensor control, etc), and robot apparatus developers implement and provide robot apparatuses based on corresponding specifications.

However, such component-based application programming models have the following limits in distribution robot applications in which heterogeneous robots cooperate.

First, since it is difficult to standardize component models used in robot platforms because of practical reasons and so on, heterogeneous robots have different component models, which make it difficult and complicated to make distribution robot applications.

Second, if standard component models which all robot platforms use in common are defined in spite of various practical reasons, it is possible to solve the first problem. However, there is a problem that such an approach does not still solve. In order to perform a robot application, not only integration of components operating inside a robot but also integration with an external legacy system or various devices in a circumstance or others are inevitable. For example, in order to provide news or weather information, integration with a corresponding information system is necessary, and in order to control a TV set or a gas valve, integration with a home network is necessary. Consequently, components outside robots still have different models.

SUMMARY OF THE INVENTION

An object of The present invention is to provide an apparatus and method for enabling heterogeneous robot platforms having different component models to collaborate through minimum standardized interfaces such that integration of robots or integration of robots and the external is possible.

An embodiment of the present invention provides a component integration apparatus for collaboration of a heterogeneous robot includes: a standard interface unit that provides a common standard interface for controlling components that control the individual functions of the robot; an adapter component that transmits commands to enable external components to call the components through the standard interface unit; and a proxy component that transmits commands to enable the components to call the external components through the standard interface unit.

The external components and the components may have different component models.

The common standard interface may be a general-purpose remote procedure call model capable of controlling and integrating the components in a standardized method.

The adapter component may convert a command having a form of the standard interface into a command having a form of the component model.

The proxy component may convert the command having the form of the component model into the command having the form of the standard interface.

The adapter component may transmit commands to enable an external application to call the components through the standard interface unit.

The components may include specifications defining calls of corresponding robot functions.

When a command is input through the standard interface unit, the adapter component may call a corresponding component among the components on the basis of the specifications.

Another embodiment of the present invention provides a component integration method for collaboration of a heterogeneous robot comprises: receiving a command for controlling components that control the individual functions of the robot by a standard interface unit, and determining the transmission path of the command by the standard interface unit; when it is determined in the determining that the command has been transmitted from external components, transmitting the command to call the components through the standard interface unit; and when it is determined in the determining that the command has been transmitted from the components, transmitting the command to call the external components through the standard interface unit.

According to the embodiments of the present invention, heterogeneous robot platforms having different component models are enabled to cooperate through minimum standardized interfaces such that integration of robots or integration of a robot and the external is possible.

Further, the embodiments of the present invention make it possible not only integration of robots but also integration with an external information system or various devices in a circumstance.

DESCRIPTION OF THE PREFERRED EMBODIMENTS

Hereinafter, embodiments of the present invention will be described with reference to the accompanying drawings.

Figure 1:
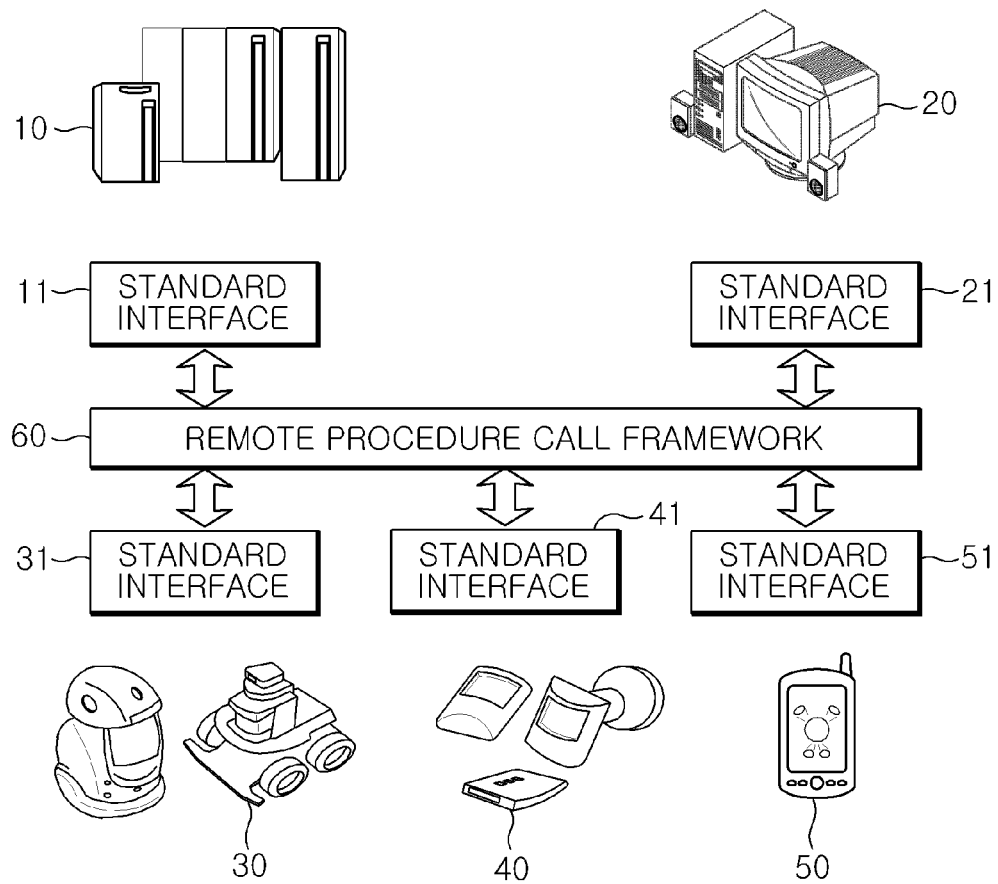
FIG. 1 is a drawing for explaining a system adapting a component integration apparatus for collaboration of heterogeneous robot according to an embodiment of the present invention.

FIG. 1 is a drawing for explaining a system adapting a component integration apparatus for collaboration of a heterogeneous robot according to an embodiment of the present invention.

Referring to FIG. 1, a system adapting a component integration apparatus for collaboration of a heterogeneous robot according to an exemplary embodiment of the present invention comprises a heterogeneous robot platform 30 having different component models, a robot platform server 20, and external applications 10, 40, and 50.

Here, the robot platform 30 may adapt an OP ROS (open platform for robotic services) and so on, but is not limited thereto. Here, individual components of the system include standard interfaces 11, 21, 31, 41, and 51 for integrating and controlling the components in a standardized method for control.

Further, the standard interfaces are standard APIs (application programming interfaces) and provide language or message forms used for communication between heterogeneous robot platforms and external applications.

The standard interfaces are based on a general-purpose RPC (remote procedure call) model for integrating and controlling heterogeneous robots having different components in a standardized method. In general, robot platforms include functions for processing a number of component models having various functions. The remote procedure call provides a method capable of calling a function providing a connection to a specific component model for executing a component in a robot platform. Therefore, the standard interfaces make heterogeneous robot platforms cooperate through a remote procedure call framework 60.

In embodiments of the present invention, robot platforms include a number of sensors or actuators for individual functions. Further, components for controlling the sensors or actuators for individual functions are formed. A common standard interface provides an interface configuration for integrating the above-mentioned components.

Also, the external application includes a device 40 in a circumstance, an external information device 50, and legacy systems 10. This external application is integrated through the standard interfaces in the system.

That is, since the standard interfaces are general-purpose RPC models, they may define standard interfaces not only for the components of the robot but also for the external application.

Figure 2:
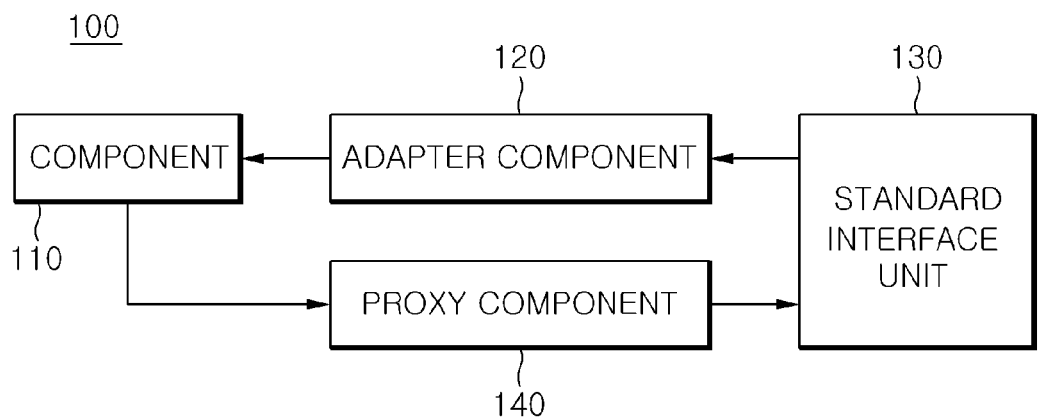
FIG. 2 is a drawing of the internal configuration of a component integration apparatus for collaboration of heterogeneous robot according to an embodiment of the present invention.
Figure 3:
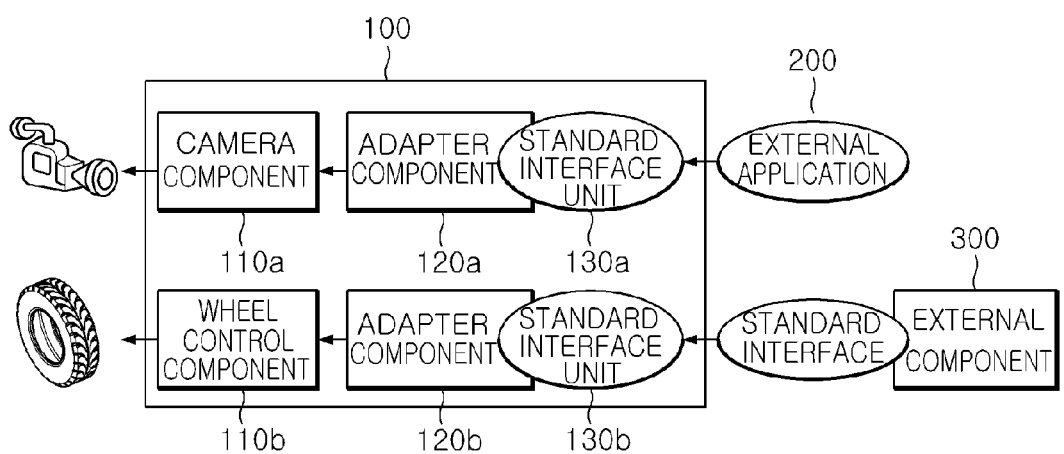
FIG. 3 is a drawing for explaining an adapter component of FIG. 2.
Figure 4:
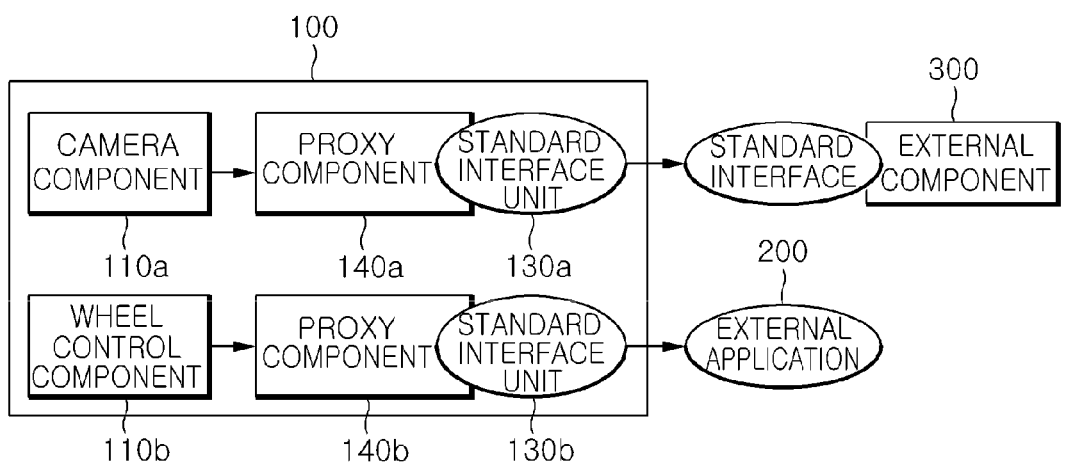
FIG. 4 is a drawing for explaining a proxy component of FIG. 2.

FIG. 2 is a drawing illustrating the internal configuration of a component integration apparatus for collaboration of a heterogeneous robot according to an embodiment of the present invention, FIG. 3 is a drawing for explaining an adapter component of FIG. 2, and FIG. 4 is a drawing for explaining for a proxy component of FIG. 2.

Referring to FIG. 2, a component integration apparatus 100 for collaboration of a heterogeneous robot according to an exemplary embodiment of the present invention comprises a standard interface unit 130, an adapter component 120, and a proxy component 140.

The standard interface unit 130 provides a common standard interface for controlling components 110 that control individual functions of the robot as described above. Here, the standard interface may adapt the standard API (application programming interface) as described above. That is, the standard interface unit provides language or message forms used for communication between the heterogeneous robot platforms and the external application through a standard interface.

Here, the components 110 are functional units for controlling the individual functions of the robot. That is, the components 110 control corresponding functions of the robot according to control commands input/output through the standard interface unit 130. In this case, the components 110 include specifications for control based on the individual component models. That is, the specifications define calls of functions of robots corresponding to the individual components. For example, in a case of a component for controlling a camera of a robot, a corresponding component specification includes control commands for performing control of power supply to the camera, left and right rotations of the camera, etc.

Also, as described above, the standard interface unit 130 is based on the general-purpose RPC (remote procedure call) model for integrating and controlling a heterogeneous robot having different components in a standardized method. For example, in a case of a component for controlling wheels of a robot, a specification for controlling the corresponding component is implemented in a function form. Therefore, functions defined in the specification are implemented to be able to call control commands for performing control of power supply to the wheels of the robot, clockwise and counterclockwise rotations of the wheels of the robot, left and right rotations of the wheels of the robot, etc.

The adapter component 120 transmits commands such that external components (for example, components of a server or external applications, etc) can call internal components 100 through the standard interface unit 130. In order to enable access to the components 110 inside the robot platform through the standard interface unit 130, the adapter component 120 is in accordance to a component model of the corresponding component.

For example, referring to FIG. 3, when an internal component for controlling a camera of a robot is a component 110a and an external component is a control component 300 of a server, the external component 300 issues a series of commands for driving the camera to acquire images and receiving the images through the standard interface. Then, the commands issued from the external component 300 are transmitted to an adapter component 120a through a standard interface unit 130a of the robot having the camera as a component. Next, the adapter component 120a transmits the received commands to the internal component 110a to drive the camera according to the corresponding commands.

Also, the external components 300 have component models different from the internal components 110. That is, since the external components 300 and the internal components 110 cannot cooperate in a direct method, they cooperate through the above-mentioned standard interface unit 130.

The proxy component 140 transmits commands such that components can call the external components 300 through the standard interface unit 130. The proxy component 140 enables components 100 operating inside the robot to be integrated with external applications 200 or external components 300 on the basis of unique component models of the robot.

For example, referring to FIG. 4, it is assumed that an internal component for controlling wheels of the robot is a component 110b and an external component is a control component 300 of a server. First, the internal component 110b issues a drive state of the wheels as a command. Then, the proxy component 140 converts the corresponding command into the command appropriate for the standard interface and transmits it to the standard interface unit 130. Next, the standard interface unit 130b transmits the corresponding command to the external component 300. Then, the external component 300 may determine the state of the remote wheels without requiring a separate process.

Also, the adapter component 120 may convert a command having a form of a standard interface into a form of a component model. That is, when the external component 300 calls the internal component 110 through the standard interface unit 130, the adapter component 120 converts the corresponding command into an internal component model form and transmit it to the internal component 110. For example, when the internal component shown in FIG. 3 is the component 110b for controlling the wheels of the robot and the external component is the control component 300 of the server, the external component 300 issues a series of commands for driving the wheels of the robot or controlling the drive speed through the standard interface. Then, the commands issued from the external component 300 are transmitted to the adapter component 120b through a standard interface unit 130b of the robot having the wheels as components. Next, the adapter component 120b converts the received commands appropriately for the component model of the internal component and transmits them to the internal component 110b. Then, the internal component 110b drives the wheels according to the corresponding commands without a separate process.

Further, the adapter component 120 may transmit a command to enable the external applications 200 to call the components 110 through the standard interface unit 130. That is, as described above, the external applications 200 include a device in a circumstance, an external information device, and legacy systems. Therefore, the external applications 200 transmit their information through the standard interface. Then, the adapter component 120 receives the information of the external applications through the standard interface unit 130 and provides the information to corresponding components. For example, it is assumed that the internal component shown in FIG. 3 is the component 110a for controlling the camera of the robot and the specification of the internal component has a command to turn on the camera when brightness is equal to or greater than a reference value. When the external application 200 is a brightness sensor, the external application 200 issues a current brightness information through the standard interface. Then, the adapter component 120a receives the current brightness information through the standard interface unit 130a and provides the current brightness information to the internal component 110a. When the corresponding brightness information is equal to or greater than the reference value, the internal component 100a turns on the corresponding camera.

Also, the proxy component 140 may convert a command having a component model form into a command having a standard interface form. This has an inverse order to the process of the adapter component described above and thus a detailed description thereof is omitted.

Figure 5:
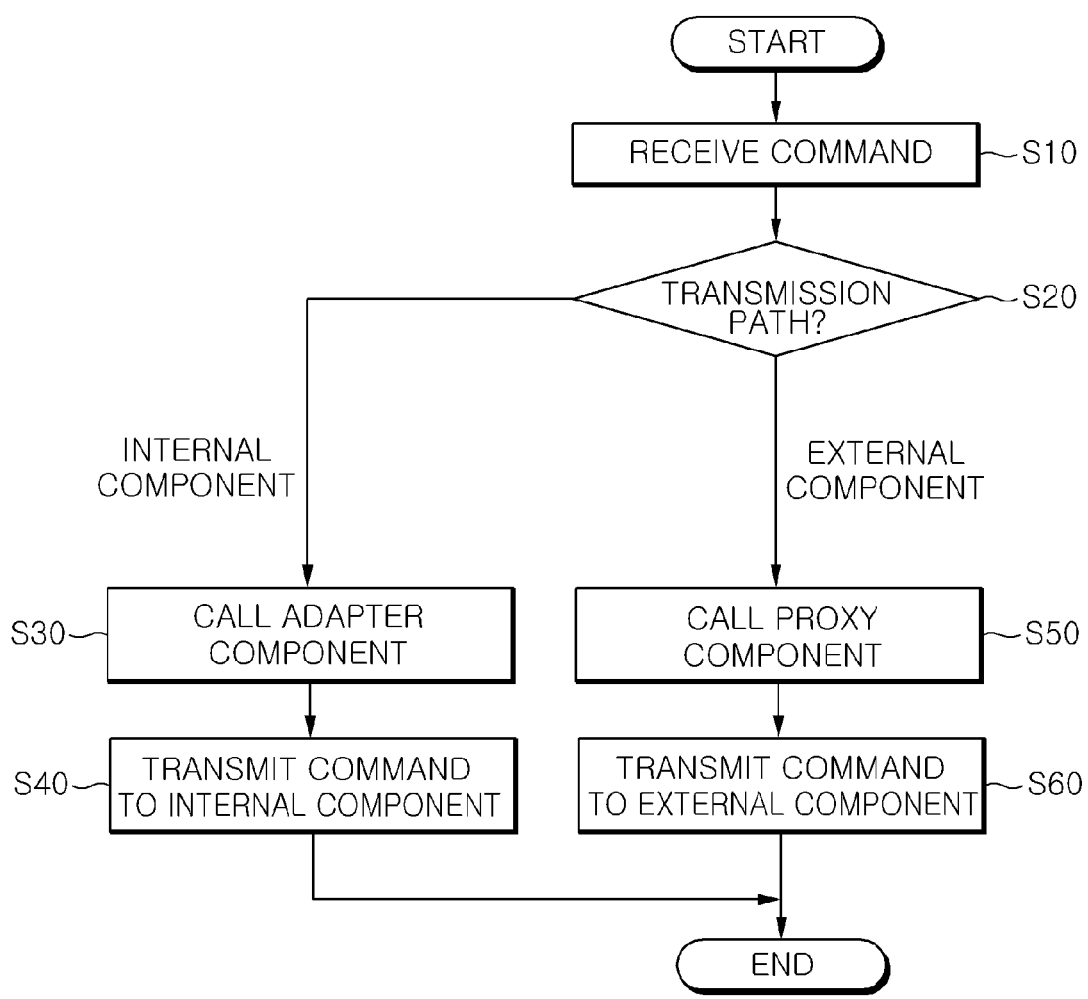
FIG. 5 is a drawing of the process order of a component integration method for collaboration of a heterogeneous robot according to an embodiment of the present invention.

FIG. 5 is a drawing illustrating the process order of a component integration method for cooperation of a heterogeneous robot according to an exemplary embodiment of the present invention. In the description, a description of the same components as shown in FIGS. 1 to 4 and a repeated description are omitted.

Referring to FIG. 5, a component integration method for collaboration of a heterogeneous robot according to an embodiment of the present invention comprises receiving commands for controlling components that control the individual functions of the robot (S10), determining the transmission path of the commands (S20), transmitting the commands to call internal components through a standard interface unit if it is determined in S20 that the commands have been transmitted from external components (S30 and S40), and transmitting the commands to call the external components through the standard interface unit if it is determined in S20 that the commands have been transmitted from the internal components (S50 and S60).

The component integration method for collaboration of a heterogeneous robot described above will be described in regards to examples according to the transmission path.

First, a case in which it is determined in S20 of FIG. 5 that a command has been transmitted from an external component will be described. Here, it is assumed that an internal component is the component 110a for controlling the camera of the robot and an external component is the control component 300 of the server (see FIG. 3).

Next, the external component 300 issues a series of commands for driving the camera to acquire images and receiving the images through the standard interface. Then, the standard interface unit 130a receives the commands issued from the external component and calls the adapter component 120a connected to the camera component. Then, the adapter component 120a transmits the received commands to the internal component 110a to drive the camera according to the corresponding commands.

Meanwhile, a case in which it is determined in S20 of FIG. 5 that a command has been transmitted from an external component will be described. Here, it is assumed that an internal component is the component 110b for controlling the wheels of the robot and an external component is the control component 300 of the server. First, the internal component 110b issues the drive state of the wheels or others as a component. Then, the proxy component 140b converts the corresponding command appropriately for the standard interface and transmits the command to the standard interface unit 130b. Next, the standard interface unit 130b transmits the corresponding command to the external component 300. That is, the external component receives the state of the remote wheels through the standard interface without a separate process (see FIG. 4).

As such, according to the exemplary embodiments of the present invention, heterogeneous robot platforms having different component models are enabled to cooperate through minimum standardized interfaces such that integration of robots or integration of a robot and the external is possible.

Further, the exemplary embodiments of the present invention make it possible not only integration of robots but also integration with various devices in a circumstance or an external information system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A component integration apparatus for collaboration of a heterogeneous robot comprising:
    a standard interface unit that provides a common standard interface for controlling components that control individual functions of the robot;
    an adapter component that transmits commands to enable external components to call the components through the standard interface unit; and
    a proxy component that transmits commands to enable the components to call the external components through the standard interface unit.

2. The component integration apparatus for collaboration of a heterogeneous robot of claim 1, wherein the external components and the components have different component models.

3. The component integration apparatus for collaboration of a heterogeneous robot of claim 2, wherein the standard interface is a general-purpose remote procedure call model capable of controlling and integrating the components in a standardized method.

4. The component integration apparatus for collaboration of a heterogeneous robot of claim 2, wherein the adapter component converts a command having a form of the standard interface into a command having a form of the component model.

5. The component integration apparatus for collaboration of a heterogeneous robot of claim 2, wherein the proxy component converts the command having the form of the component model into the command having the form of the standard interface.

6. The component integration apparatus for collaboration of a heterogeneous robot of claim 1, wherein the adapter component transmits commands to enable an external application to call the components through the standard interface unit.

7. The component integration apparatus for collaboration of a heterogeneous robot of claim 1, wherein the components include specifications defining calls of corresponding functions of the robot.

8. The component integration apparatus for collaboration of a heterogeneous robot of claim 7, wherein when a command is input through the standard interface unit, the adapter component calls a corresponding component among the components on the basis of the specifications.

9. A component integration method for collaboration of a heterogeneous robot comprising:
    receiving a command for controlling components that control individual functions of the robot by a standard interface unit,
    determining the transmission path of the command by the standard interface unit;
    transmitting the command to call the components through the standard interface unit when it is determined in the determining that the command has been transmitted from external components, by a adapter component; and
    transmitting the command to call the external components through the standard interface unit when it is determined in the determining that the command has been transmitted from the components, by a proxy component.

10. The component integration method for collaboration of a heterogeneous robot of claim 9, wherein the external components and the components have different component models.

11. The component integration method for collaboration of a heterogeneous robot of claim 10, wherein the standard interface is a general-purpose remote procedure call model capable of controlling and integrating the components in a standardized method.

12. The component integration method for collaboration of a heterogeneous robot of claim 10, wherein the transmitting the commands to call the components converts a command having a form of the standard interface into a command having a form of the component model.

13. The component integration method for collaboration of a heterogeneous robot of claim 10, wherein the transmitting of the commands to call the external components converts the command having the form of the component model into the command having the form of the standard interface.

14. The component integration method for collaboration of a heterogeneous robot of claim 9, wherein the components include specifications defining calls of corresponding robot functions, and the transmitting of the commands to call the components, when a command is input through the standard interface unit, calls a corresponding component among the components on the basis of the specifications.

* * * * *